(12) United States Patent
Kakei (10) Patent No.: US 7,762,723 B2
(45) Date of Patent: Jul. 27, 2010

(54) LINEAR MOTION GUIDE UNIT

(75) Inventor: Shigeki Kakei, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 1049 days.

(21) Appl. No.: 11/484,631

(22) Filed: Jul. 12, 2006

(65) Prior Publication Data

US 2007/0025651 A1 Feb. 1, 2007

(30) Foreign Application Priority Data

Jul. 27, 2005 (JP) .............................. 2005-217550

(51) Int. Cl.
*F16C 29/06* (2006.01)
(52) U.S. Cl. ........................................................ 384/45
(58) Field of Classification Search .................. 384/43, 384/45
See application file for complete search history.

(56) References Cited

U.S. PATENT DOCUMENTS

| | | | |
|---|---|---|---|
| 4,582,369 A * | 4/1986 | Itoh | 384/13 |
| 5,562,346 A * | 10/1996 | Kuo | 384/45 |
| 6,729,761 B2 * | 5/2004 | Matsui et al. | 384/45 |
| 7,108,426 B2 * | 9/2006 | Itabashi et al. | 384/45 |

FOREIGN PATENT DOCUMENTS

JP 2003-90338 3/2003

* cited by examiner

*Primary Examiner*—William C Joyce
(74) *Attorney, Agent, or Firm*—Browdy and Neimark, PLLC (57) ABSTRACT

A linear motion guide unit permitted to operate for long service life with substantial maintenance-free for lubrication. The linear motion guide unit has heavy load capacity even with shrinking in construction. The linear motion guide unit is allowed to work with high-speed sliding operation and high tact. To this end, return passages are made inside a carriage of a slider in a geometry lying obliquely upwards of load-carrying races. The return passages are apart away from their associated load-carrying races by a distance less or equal to twice a diametral dimension of a rolling element. End caps are integrally made with spigots each of which is raised above a surface of the associated end cap facing on the carriage, thereby providing any one of forward and aft ends of the return passage. The spigots communicate with lubricant paths extending from lubricating ports made in the end caps.

7 Claims, 7 Drawing Sheets

LINEAR MOTION GUIDE UNIT

FIELD OF THE INVENTION

The present invention relates to a linear motion guide unit comprised of an elongated guide rail and a slider that is allowed to move on the elongated guide rail relatively to the guide rail by virtue of more than one rolling element.

BACKGROUND OF THE INVENTION

Recently, linear motion guide units expected to work with maintenance-free condition for lubrication are becoming more used in any parts moving in a reciprocating manner in a diversity of machines. Extensively various applications to machines has needed a diversity of linear motion guide units that could ensure the maintenance-free operating conditions for lubrication.

In the commonly assigned Japanese Patent Laid-Open No. 2003-90338, there is disclosed a linear motion guide unit in which tubular connectors are installed to communicate turnaround passages with their associated return passage. With the prior linear motion guide unit constructed as recited earlier, the tubular connectors are each made up of a connector part of a spacer arranged on any one of lengthwise opposite ends of a return passage member lying within a lengthwise bore in a carriage, and a complementary connector part lying in any one of lengthwise opposite end caps, making the return passage and the associated turnaround passages flush with one another to finish the recirculating circuit with causing no gap at the connection between the return passage and the turnaround passages, thereby making sure of allowing the rolling elements to transfer smoothly from the turnaround passages to their associated return passage and also from the return passage to the turnaround passages in a circulating manner. Moreover, the return passage member is made of sintered resinous material of cellular texture adapted to retaining lubricant therein to continue applying an adequate lubricant around the rolling elements.

With the prior linear motion guide units recited earlier, nevertheless, the return passages are made in a slider in a way lying horizontally in parallel with load-carrying races at sidewise faraway areas. This geometry of the return passages needs making the slider larger in widthwise measurement. Meanwhile, advanced technology has come to hope any linear motion guide unit of miniaturized construction even though there are used rolling elements larger in diameter than conventional ones to have high load capacity. However, it still remains a further challenge to the linear motion guide unit miniaturized as recited earlier to continue supplying any lubricant to the rolling elements with substantially free of maintenance for lubrication.

SUMMARY OF THE INVENTION

In view of the current issue of maintenance-free operating condition for lubrication related with the linear motion guide units that have the large load capacity even with made smaller in construction, the present invention has as its principal object the provision of a linear motion guide unit constructed as to achieve the maintenance-free operation for lubrication. More particular, the present invention provides a linear motion guide unit in which end caps are each devised in construction for bearing against larger load capacity even though smaller in construction while return passages are each made of a tubular member capable of retaining lubricant therein and getting the lubricant oozing to facilitate high-speed sliding motion with high tact to thereby ensure positive lubrication without accompanying leakage of lubricant.

The present invention is concerned with a linear motion guide unit; comprising a guide rail having first lengthwise raceway grooves thereon, and a slider allowed to move in sliding manner relatively to the guide rail, the slider being comprised of a carriage made thereon with second raceway grooves extending in opposition to the first raceway grooves and further made therein with a pair of return passages extending apart from load-carrying races defined between the first and second raceway grooves, end caps secured to forward and aft ends of the carriage and made therein with turnaround passages to communicate the load-carrying races and the return passages with one another, and more than one rolling element allowed to roll through circulating circuits made up of the load-carrying races, return passages and turnaround passages; wherein the return passages are made in a geometric relation lying obliquely upwards of the load-carrying races while the return passages are apart from their associated load-carrying races by a distance less or equal to twice a diameter of the rolling element; and wherein the end caps are made integrally thereon with spigots each of which is raised above the associated end cap towards the carriage to connect with the associated return passage to form any one end of the return passage, while the end caps are made therein with a lubricating port and lubricant paths extending from the lubricating port to the spigots.

In one aspect of the present invention, a linear motion guide unit is provided in which the return passages are each made up of a tubular member of porous structure adapted to be impregnated with lubricant, the tubular member fitting into a bore made in the carriage, and the spigots fitting into forward and aft ends of the bore to join with the tubular member.

In another aspect of the present invention a linear motion guide unit is provided in which the end caps are each made up of an end cap major part and a spacer part to fit into the end cap major part, and the end cap major part is made at widthwise opposite ends thereof with outside curved grooves to provide the turnaround passages, while the spacer part is made at widthwise opposite ends thereof with inside curved grooves to provide the turnaround passages. Moreover, the end cap major part includes first turnaround passage halves having therein the outside curved grooves to provide the turnaround passages, first spigot halves communicating with the first turnaround passage halves to provide the spigots that constitute partly the return passages, and a top portion joining the first turnaround passage halves together and also joining the first spigot halves together with one another. Also, the spacer part includes therein second turnaround passage halves having therein the inside curved grooves to provide the turnaround passages in combination with the first turnaround passage halves, second spigot halves communicating with the second turnaround passage halves to provide the spigots in combination with the first spigot halves, which constitute partly the return passages, and a bridge portion joining the second turnaround passage halves together and also joining the second spigot halves together with one another.

In another aspect of the present invention, a linear motion guide unit is provided in which the end cap major part is made therein with mating depressions and deep steps cut in close along the mating depressions and in which the spacer part is combined in place with the end cap major part in such a mating relation that the bridge portion of the spacer part fits into the mating depressions inside end cap major part while the second turnaround passage halves of the spacer part fit into the associated deep steps in the end cap major part.

In a further another aspect of the present invention a linear motion guide unit is provided in which the first spigot halves of the end cap major part join with the second spigot halves of the spacer part to complete the spigots and in which the second spigot halves of the spacer part are each made to account for more in circular direction than a semicircle to provide any room for the lubricant paths. As an alternative, the second spigot halves of the spacer part are each made to account for 53% to 62% of a circle round the spigots.

In another aspect of the present invention, a linear motion guide unit is provided in which the end cap major part is made with the lubricating port and also made at the top portion thereof with first lubricating grooves communicating with the lubricating port, and in which the spacer part is made at the bridge portion thereof with second lubricating grooves that are in opposition to the first lubricating grooves to mate with the first lubricating grooves to define the lubricant paths between them. With a version of the present invention, the guide rail is rectangular in transverse section and provided on both lengthwise sides thereof with the first raceway grooves, and the slider fits over and conforms to the guide rail to move relatively to the guide rail. Moreover, the end caps are made of synthetic resin stained blue different in color from the carriage.

With the linear motion guide unit constructed as stated earlier, the slider fits over the guide rail rectangular in transverse section in a way allowed to slide relatively to the guide rail by virtue of more than one rolling element. The slider is composed of the carriage and end caps secured on forward and aft ends of the carriage. The end caps are each made therein with the turnaround passages to connect the load-carrying races defined between the confronting raceway grooves cut in the guide rail and the carriage with the return passages made in the carriage in parallel with the load-carrying races. Especially, the return passages are apart away from their associated load-carrying races in an interval relation that a distance between centers of return passage and the associated load-carrying race is set less or equal to twice a diametral dimension of a rolling element. Moreover, the return passages are made inside the carriage in a geometry lying obliquely upwards of load-carrying races, making the slider reduced in widthwise measurement. With the linear motion guide unit of the present invention, positive lubrication with lubricant fed from the lubricating port may be ensured even though the end cap shrinks in space to have therein the turnaround passages.

DETAILED DESCRIPTION OF THE PREFERRED EMBODIMENTS

The linear motion guide unit according to the present invention is well adapted for use in any relatively sliding components in machinery as diverse as measurement/inspection instruments, medical instruments, micromachines, semiconductor manufacturing equipment, and so on. Prior to disclosing in detail preferred versions of the linear motion guide unit of the present invention with referring the accompanying drawings, it is to be noted that the linear motion guide unit of the present invention is envisaged further developing the prior linear motion guide unit disclosed in the commonly assigned Japanese Patent Laid-Open No. 2003-90338. With the linear motion guide unit constructed according to the present invention, the widthwise opposing return passages in a carriage 3 of a slider are made in a geometry lying biased more sidewise inwards or center-ward than in the prior linear motion guide unit to make the slider narrower or slimmer in width than the prior one even though there are used rolling elements 5 of ball larger in diameter than conventional ones to make sure of high load capacity. End caps 4 are each provided therein with tubular connectors or spigots 27 adapted to fit into their associated bores 9 in the carriage 3 to make connection with their associated tubular members 6, making certain of smooth rolling motion of the rolling elements 5 throughout circulating circuits. The end caps 4 are each further made up of an end cap major part 7 and a spacer part 8, which are joined together with each other to make a lubricant path 54 between them to make sure of positive lubrication around the rolling elements 5. Moreover, the tubular members 6 fit into their associated bores 9 in the carriage 3 are made to readily soak up lubricant to facilitate maintenance-free condition for lubrication.

Figure 1:
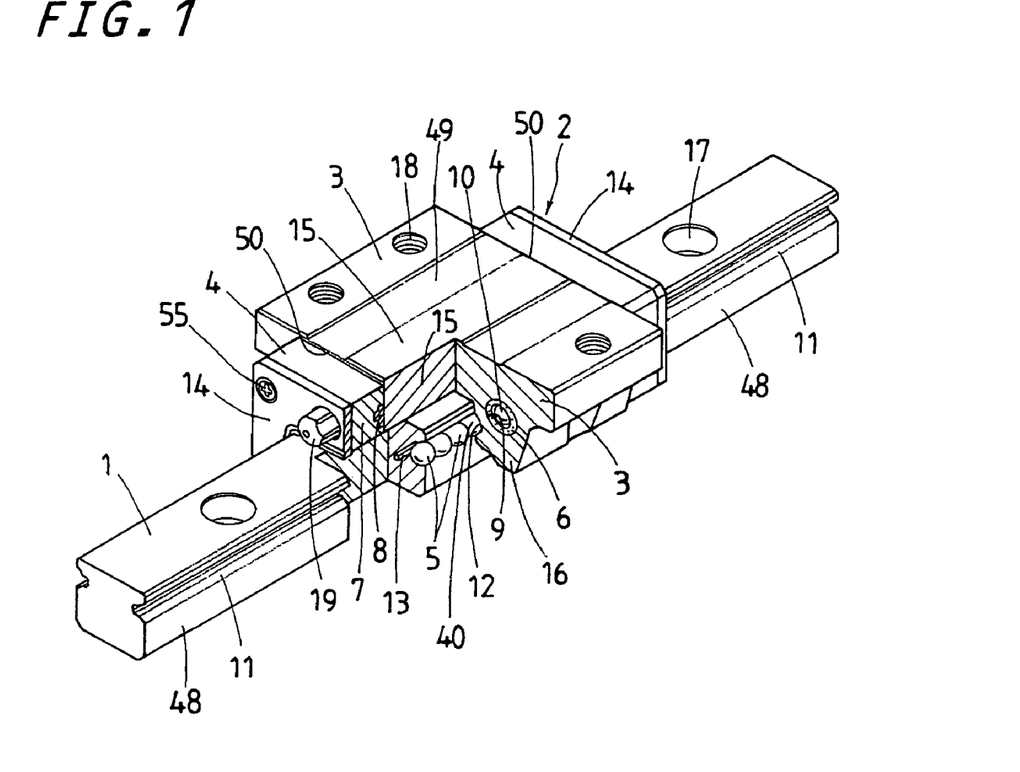
FIG. 1 is a partially cutaway view in perspective illustrating a preferred embodiment of a linear motion guide unit according to the present invention.
Figure 2:
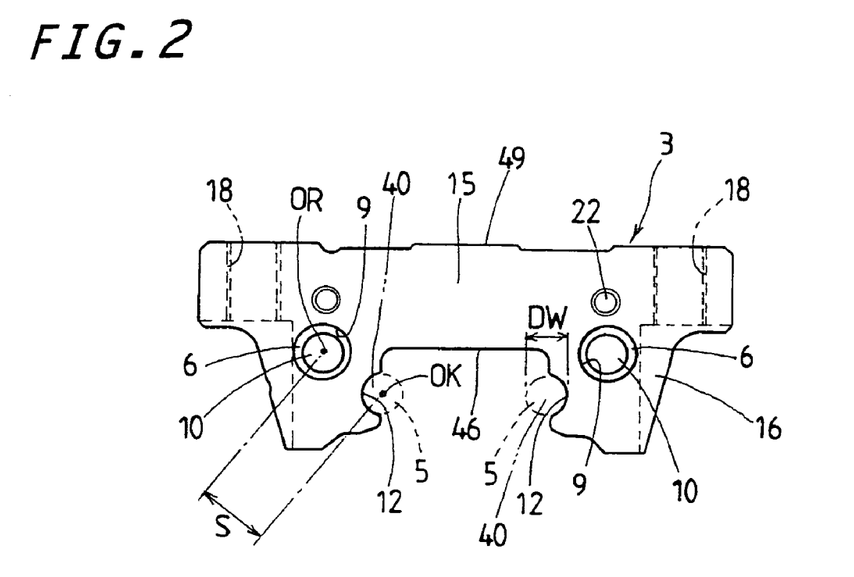
FIG. 2 is a view in front elevation of a carriage for a slider in the linear motion guide unit of FIG. 1, and in which tubular members are shown in fit relation into their associated bores made in the carriage.
Figure 3:
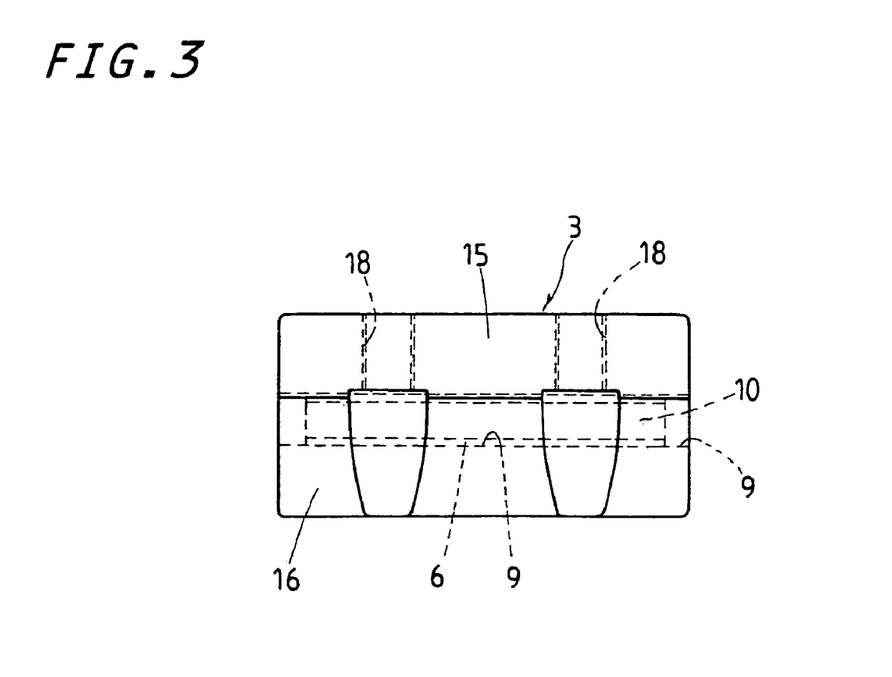
FIG. 3 is a view in side elevation of a carriage of FIG. 2.

The linear motion guide unit of the present invention, as shown in FIGS. 1 to 3, is in general composed of an elongated guide rail 1 rectangular in transverse section and made on both lengthwise sides 48 thereof with raceway grooves 11, one to each side, and a slider 2 that fits over or conforms to the guide rail 1 in a way to move relatively to the guide rail 1 by virtue of more than one rolling element 5. The guide rail 1 is made with some holes 17 that are used to fasten the guide rail 1 to any stationary bed including a machine bed, mounting base, workbench, other counterpart, and so on. On the slider 2, there are made some threaded holes 18 that are used to fasten the slider 2 to any component including a workpiece, and so on. The slider 2 is composed of a carriage 3 made thereon with raceway grooves 12 lying in opposition to the raceway grooves 11 on the guise rail 1 and further made therein with return passages 10 extending in parallel with the raceway grooves 12, end caps 4 arranged on forward and aft ends of the carriage 3, one to each end, and formed therein with turnaround passages 30, end seals 14 attached to outward end surfaces of the end caps 4, and more than one rolling element 5 allowed to roll through load-carrying races 40 defined between the raceway grooves 11 made on the guide rail 1 and the raceway grooves 12 formed on the carriage 3. The end caps 4 are fastened to the carriage together with their associated end seals 14 with fastener bolts 55 that extend through matching holes 23 in the end caps 4 and end seals 14 to fit in threaded holes 22 in the carriage 3. The carriage 3 is made up of widthwise opposing side portions 16 and a ceiling portion 15 joining the side portions 16 together with one another to define form a recess 46 open downwards. Each end cap 4 is also made up of widthwise opposing side areas 52 lying in conformity with the widthwise opposing side portions 16 of the carriage 3 and a ceiling area 51 joining the side areas 52 together with one another to define a recess 47 open downwards. The slider 2 fits over the guide rail 1 for sliding movement in a way the recess 46 inside the carriage 3 and the recesses 47 inside the end caps 4 conform to the guide rail 1.

The linear motion guide unit constructed according to the present invention has a constructional feature that the load-carrying race 40 and the associated return passage 10 are made in a geometric relation that a center distance (S) extending from a center (OK) of the load race 40 to a center (OR) of the return passage 10 is not more than twice the diametral dimension of the rolling element 5. Moreover, the linear motion guide unit of the present invention has another constructional feature that the return passages 10 are placed obliquely upwards of the load-carrying races 40 at the top of the carriage 3 and laid biased widthwise center-ward so as to render an interval between the return passages 10 less than in conventional construction, thereby making the linear motion guide unit less or slim in widthwise measurement. With the linear motion guide unit constructed as stated earlier, especially, the center distance (S) extending between the center (OK) of the load-carrying race 40 and the center (OR) of the return passage 10, as shown in FIG. 2, is less or equal to twice the diameter of the rolling element 5. When the rolling element has the diameter of (Dw) in the version explained here, the center distance (S) will refer to 1.84 (Dw). The return passages 10 are made at the top of the carriage 3 to get closer to a top surface 49 of the carriage 3 than the load-carrying races 40 while getting biased center-ward with one another. Thus, the geometry that the return passages 10 lying closer to a mounting surface of the carriage 3 to bear any other component against there are biased center-ward makes it possible to get the slider 2 as less as permitted in widthwise measurement, thereby rendering the slider 2 itself reduced or compact in construction.

With linear motion guide unit of the present invention, moreover, a tubular member 6 able to soak up lubricant fits into a fore-and-aft bore 9 in the carriage 3 to help substantial maintenance-free operation for lubrication over long service life. Especially, the inside circular wall of the tubular member 6 is envisaged the provision of the middle major area save forward and aft ends of the return passage 10.

The tubular member 6 is made of a sintered resinous material of porous or cellular structure. More particular, the tubular member 6 is made of, for example, fine powders of ultra-high molecular weight polyethylene, which are molded at elevated temperature while compacted into a porous or cellular structure. The resulting compact in itself is sufficient in mechanical strength, workable with precise measurement and further superior in wear proof. The cellular structure in the sintered compact is very tough to cause any clogging while excellent in soaking up, retaining and getting oozing the lubricant. Thus, the rolling elements 5 can be supplied with lubricant with accompanying reduced maintenance for long service life while rolling through the return passages 10 inside the tubular members 6.

Figure 4:
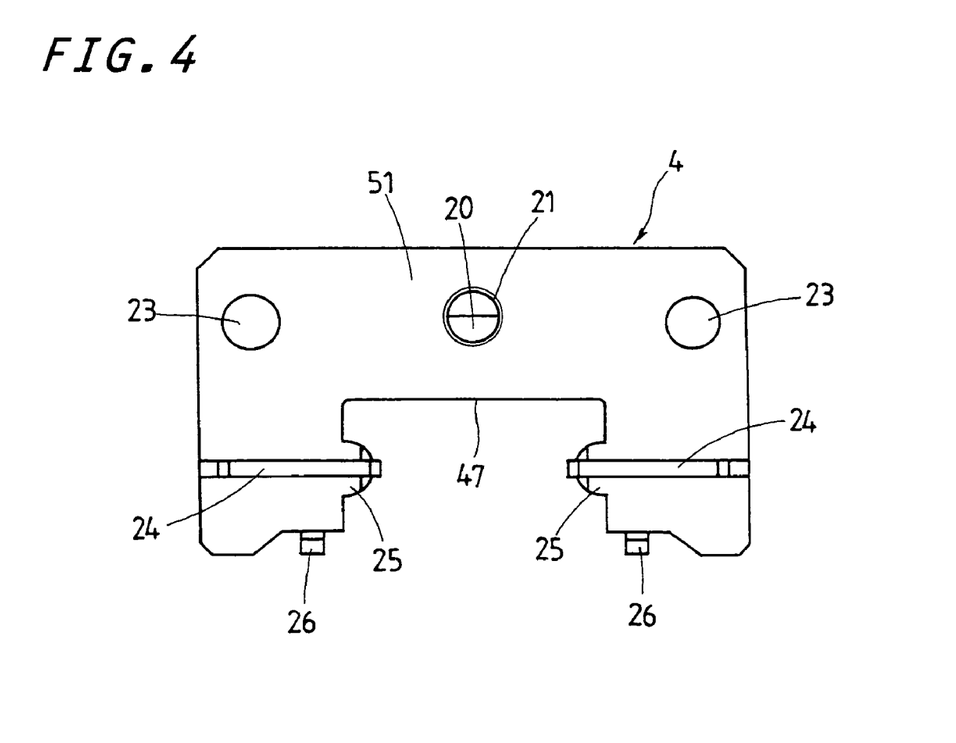
FIG. 4 is a view in front elevation of any one of end caps to be incorporated in a slider in the linear motion guide unit of FIG. 1.
Figure 5:
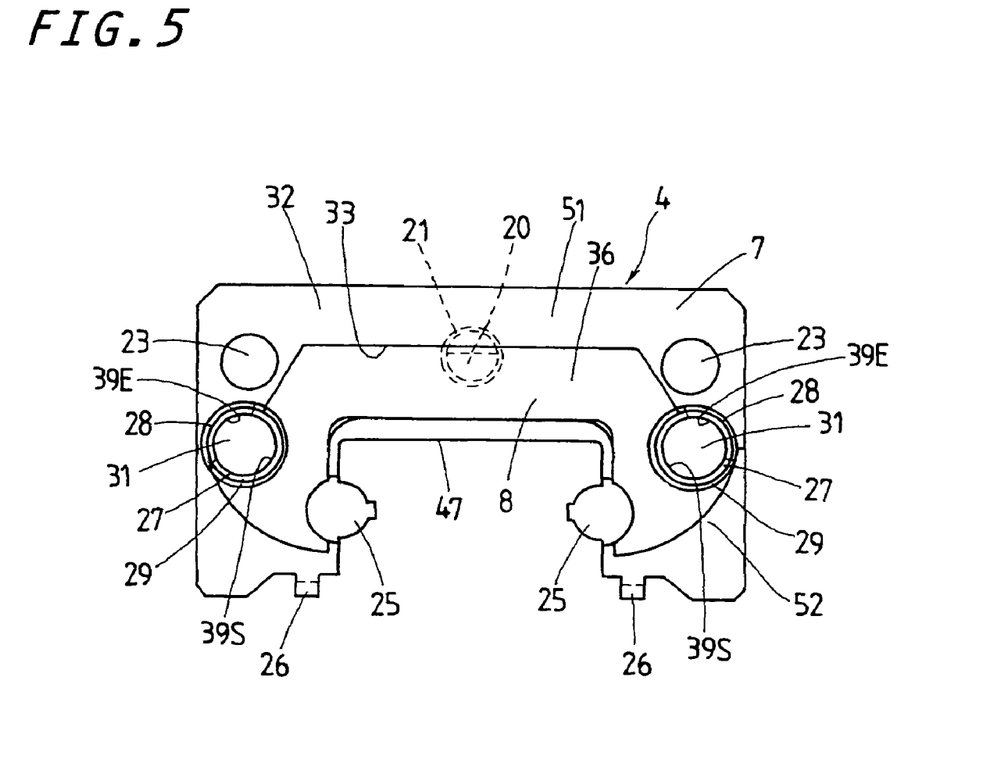
FIG. 5 is a view in rear elevation of the end cap of FIG. 4 to illustrate how a spacer part is combined inside an end cap major part.
Figure 6:
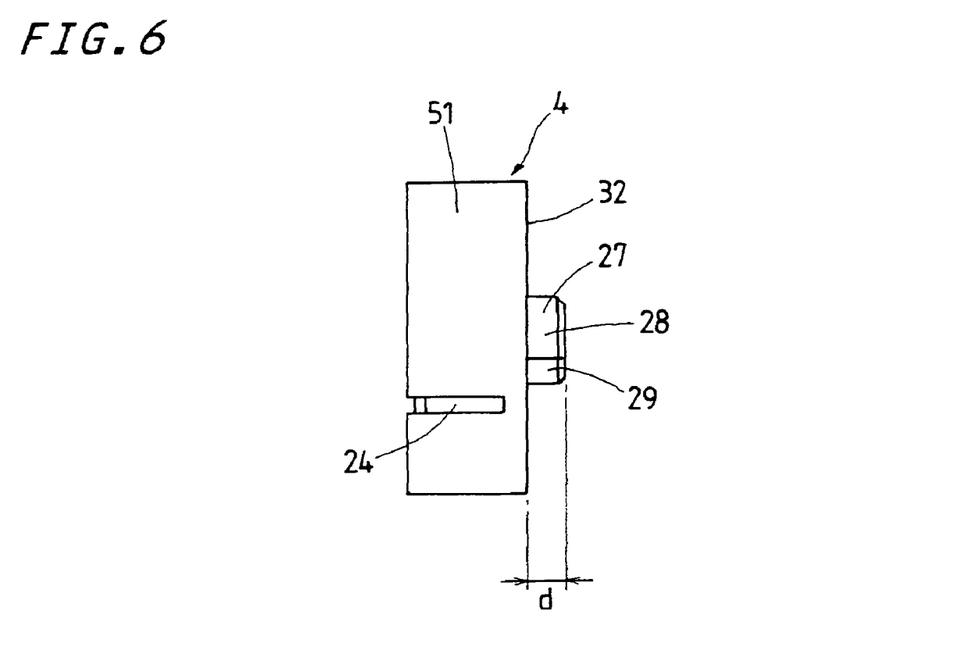
FIG. 6 shows a view in side elevation of the end cap of FIG. 5.
Figure 14:
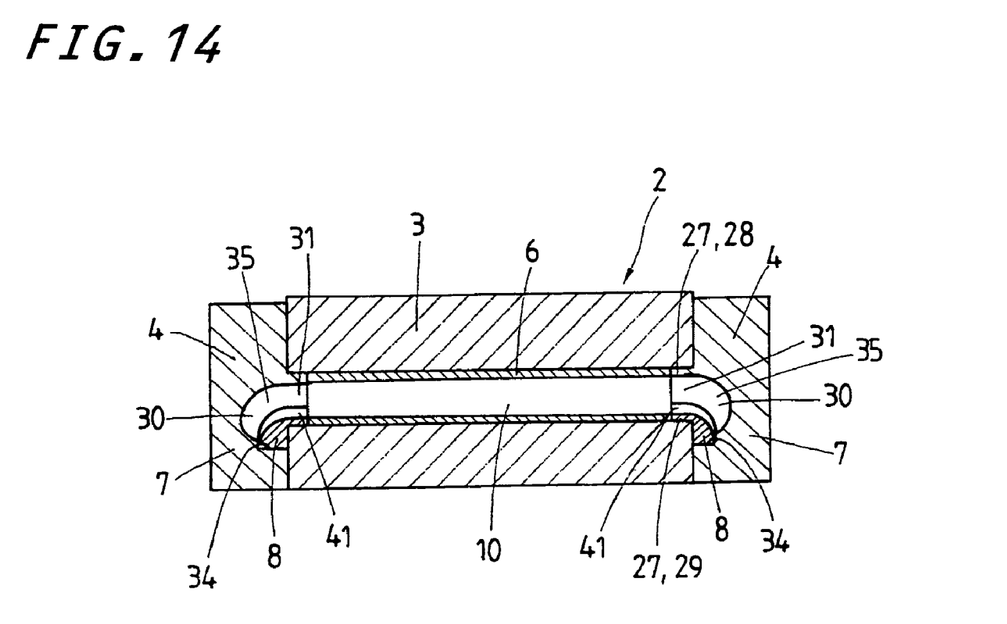
FIG. 14 is a view in longitudinal section of the slider of FIG. 1 to show how the carriage is combined with the end caps.

The end caps 4 installed on forward and aft ends 50 of the carriage 3, as shown in FIGS. 4 to 6, are each made therein with the turnaround passages 30 spaced widthwise away from one another, which are arranged to connect the load-carrying race 40 with the associated return passage 10. The end caps 4 are made integrally with spigots 27 that are raised above rear surfaces 32 of the end caps 4 to fit into forward and aft ends of the fore-and-aft bores 9 in the carriage 3 to connect the turnaround passages 30 to their associated return passages 10. The forward and aft spigots 27 of the end caps 4, as shown in FIG. 14, come into abutment against their associated ends of the tubular members 6 inside the fore- and aft bore 9 in the carriage 3 to provide the return passages 10 continuing from the spigots 27 to the fore- and aft bores 9. The spigots 27 are raised above the rear surfaces 32 of the end caps 4 up to a height of (d), which is equal or more than half the diameter (Dw) of the rolling element 5 to make sure of smooth rolling of the rolling elements 5 in the spigots 27. In the version disclosed here, the height (d) is 0.56 (Dw).

Besides, the end caps 4 are each provided therein with a scooping claw 25 that extends inside the recess 47 at a location parallel to the load-carrying race 40 to enter the raceway groove 11 on the guide rail 1 to communicate the load-carrying race 40 with the associated turnaround passage 30, making certain of smooth rolling of the rolling elements 5. Each end cap 4 has a threaded hole 21 at widthwise middle area thereof, which couples with a grease nipple 19 while communicates with a lubricating port 20. The end caps 4 are each made on an outward front surface thereof with grooves 24 to keep retainer bands 13. The end caps 4 are made of synthetic resin stained blue, for example aqua-blue, and also constructed maintenance-free for lubrication while ready for sliding movement with accuracy and easier to set the end caps 4 apart from other products in appearance.

Figure 7:
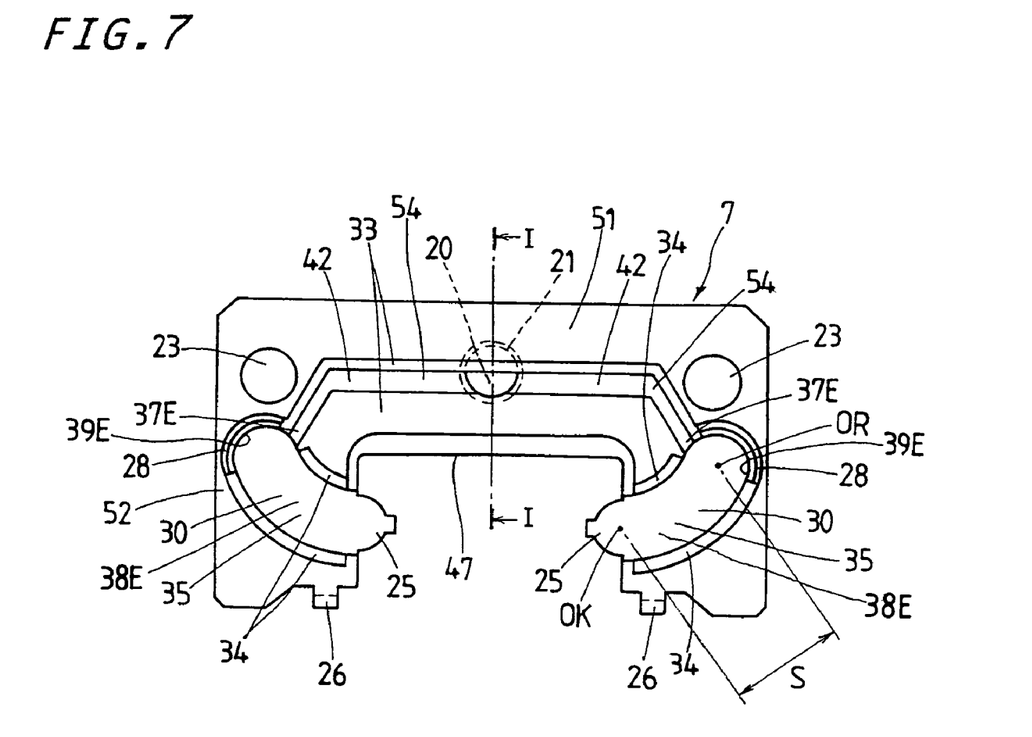
FIG. 7 is a view in rear elevation of the end cap major part in which the spacer part is shown removed out of the end cap of FIG. 5.
Figure 8:
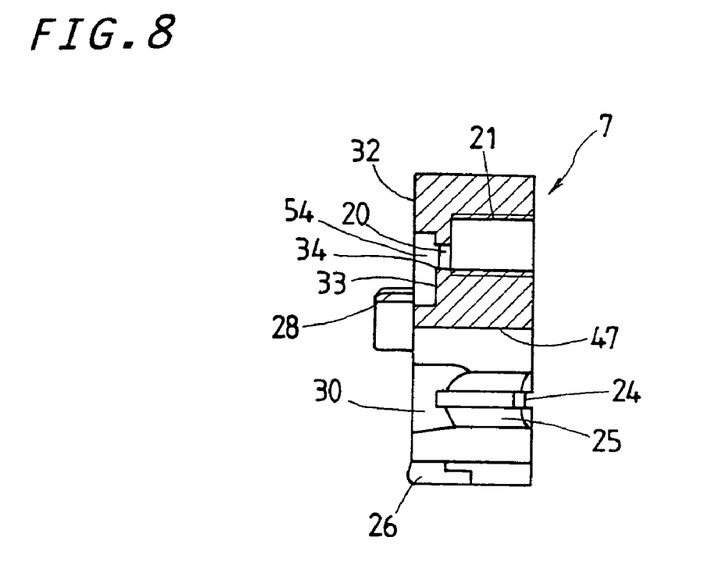
FIG. 8 is a view in transverse section of the end cap major part, the view being taken on the plane of the line I-I of FIG. 7.
Figure 9:
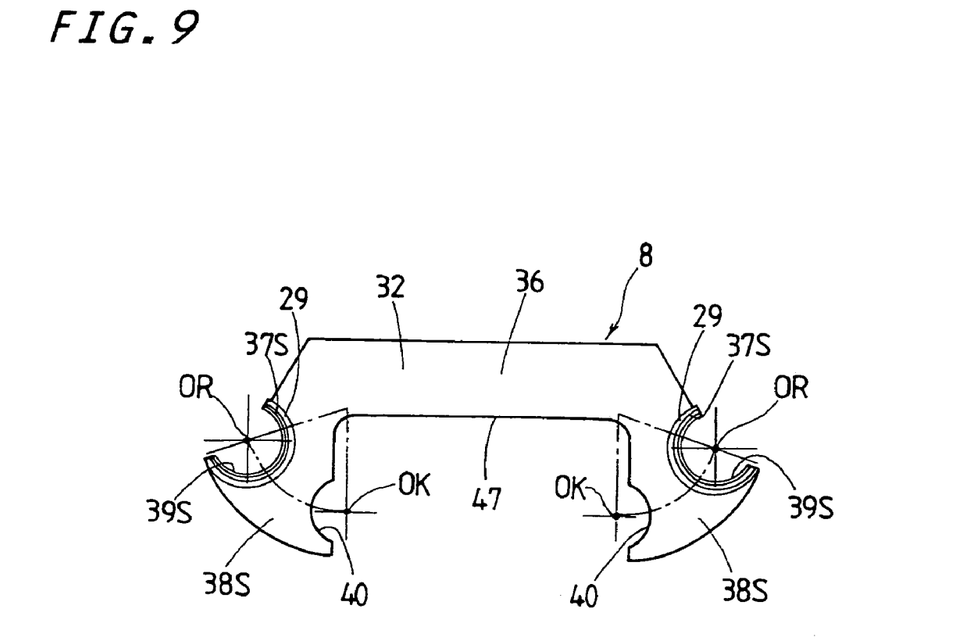
FIG. 9 is a view in rear elevation of the spacer part taken apart from the end cap of FIG. 5.
Figure 10:
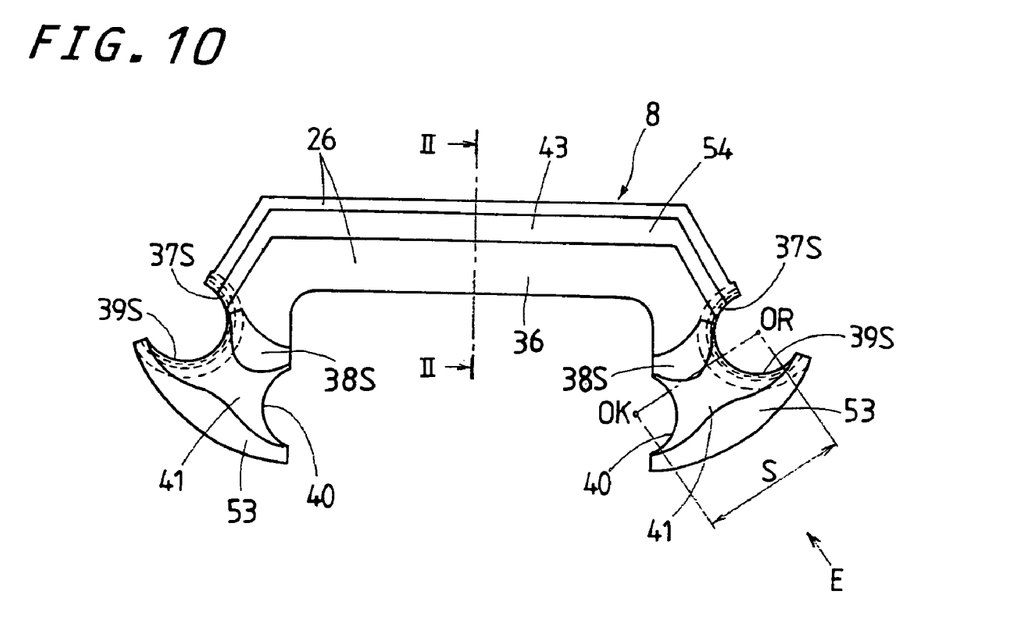
FIG. 10 is a view in front elevation of the spacer part of FIG. 9.
Figure 11:
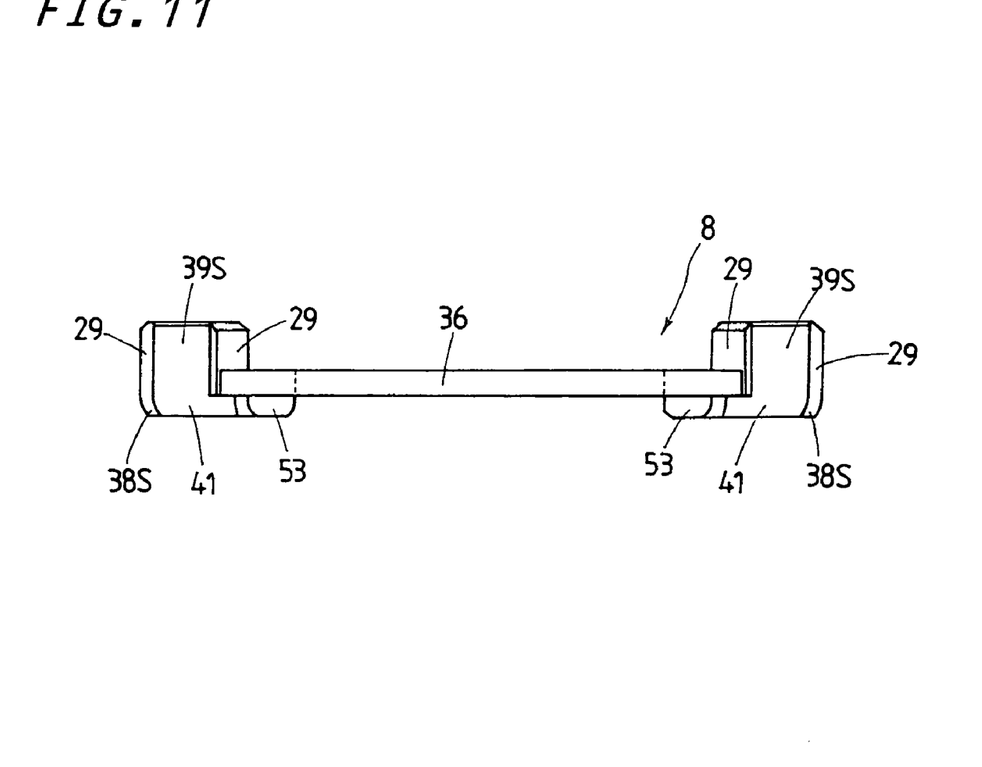
FIG. 11 is a view in plan of the spacer part of FIG. 10.
Figure 12:
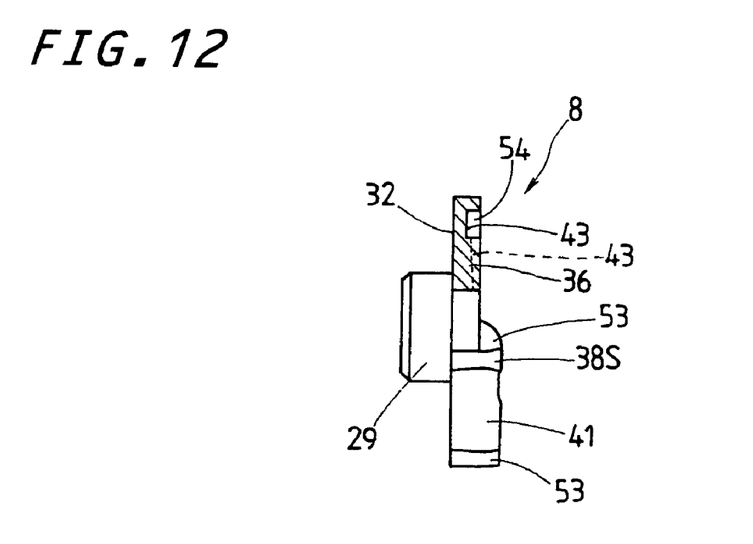
FIG. 12 is a view in transverse section of the spacer part, the view being taken on the plane of the line II-II of FIG. 10.

The end cap 4 includes an end cap major part 7 that as shown in FIGS. 7 and 8 is made therein with outside curved grooves 35 spaced widthwise-apart from one another, which correspond to turnaround passage halves 38E for the turnaround passages 30 opposed widthwise to one another. The turnaround passages 30 are each made to take a semicircular configuration across 180 degrees to guide the rolling elements 5 from the center (OK) of the load-carrying race 40 into the center (OR) of the return passage 10 and conversely from the center (OR) of the return passage 10 into the center (OK) of the load-carrying race 40. The outside curved grooves 35 to define the turnaround passage halves 38E are made in circular concaved surfaces to form outside semicircular halves of the turnaround passages 30. The end cap major parts 7 are each provided therein with mating depressions 33 and deep steps 34, which are intended to make snug fit with a spacer part 8. The depressions 33 and the deep steps 34 are all made in depth to get a rear surface 32 of the spacer part 8 placed in flush with the associated rear surface 32 of the end cap major part 7, or the surface to mate with the associated end surface 50 of the carriage 3. Moreover, the deep steps 34 cut in the end cap major part 7 are made more in depth than the depressions 33 in close relation to the depressions 33. With the end cap 4 constructed as stated earlier, the spacer part 8 is allowed to fit snugly and accurately into the end cap major part 7 in such a mating relation that a bridge portion 36 of the spacer part 8 fits into the mating depressions 33 in the end cap major part 7 while lugs 53 of the spacer part 8 lying in opposition to lubricant path ends 37S to provide turnaround passage halves 38S fit into the mating deep steps 34 of the end cap major part 7. The lugs 53 is made to provide an inside curved grooves 41 of the turnaround passage portion 38S to complete the turnaround passages 30.

In the mating depressions 33 cut in the end cap major part 7, there are made lubricating grooves 42 extend from the middle lubricating port 20 in sidewise opposite directions so as to reach lubrication passage ends 37E located in adjacency of spigot halves 28 that are provided to connect the turnaround passages 30 with their associated return passages 10. With the end cap major part 7, moreover, the deep steps 34 are cut in adjacency of the mating depressions 33 to allow the turnaround passages portions 38S of the spacer part 8 to fit into the deep steps 34 at radially opposite sides of the turnaround passages 30. The end cap major part 7 has the spigot halves 28 that are raised above the rear surface 32 of the end cap major part 7 to communicate with the outside curved grooves 35 for the provision of the spigots 27. The spigot halves 28 are each made less in circular direction than a semicircle to leave any room for the associated lubrication passage 37E. The end caps 4, especially the end cap major parts 7 are each made on the underneath thereof with hooks 26 to hold lower seals, not shown, to close any clearance left between mating surfaces of the guide rail 1 and the combined carriage 3 and end caps 4.

The spacer part 8, as shown in FIGS. 9 to 13, is composed of the widthwise opposite turnaround passage portions 38S for the provision of the turnaround passages 30, and the bridge portion 36 to connect the turnaround passage portions 38S with one another. In the turnaround passage portions 38S of the spacer part 8, there are each made the inside curved groove 41 of inside circularly concaved contour, which completes the turnaround passage 30 when lying in opposition to the associated curved groove 35. The turnaround passage portions 38S of the spacer part 8 are made in the lugs 53 extending sidelong from the bridge portion 36. The spacer part 8 has spigot halves 29 that are raised above the rear surface 32 of the spacer part 8 to provide the spigot 27 communicating with the inside curved groove 41. The spigot halves 29 on the spacer part 8 are each made more in circular direction than a semicircle, especially accounting for about 62% of the circle in the version recited here, to provide the lubrication passage end 37S. The spigot halves 29 raised above the spacer part 8 is especially made over 53 to 62% in circular range of the circle around the spigot 27, which is the circular range not negatively affecting on high-speed rolling circulation of the rolling elements 5 in light of the size of the end cap 4. The bridge portion 36 of the spacer part 8 is made therein with a lubricating groove 43 extending confronting with the middle lubricating port 20 and the lubricating grooves 42 cut in the end cap major part 7. The lubricating grooves 43 in the spacer part 8 reaches the lubrication passage ends 37S that communicate the spigot halves 29 in adjacency of the turnaround passage portions 38S. Snug fit of the spacer part 8 into the end cap major part 7 brings the outside curved grooves 35 in the end cap major part 7 into mating engagement with the inside curved grooves 41 in the spacer part 8 to define the turnaround passages 30 between them in the end cap 4. When the spacer part 8 fits into the end cap major part 7, moreover, the spigot halves 28 on the end cap major part 7 come into mating conjunction with other spigot halves 29 of the spacer part 8 to form the spigots 27 that are raised above the end cap 4.

Figure 13:
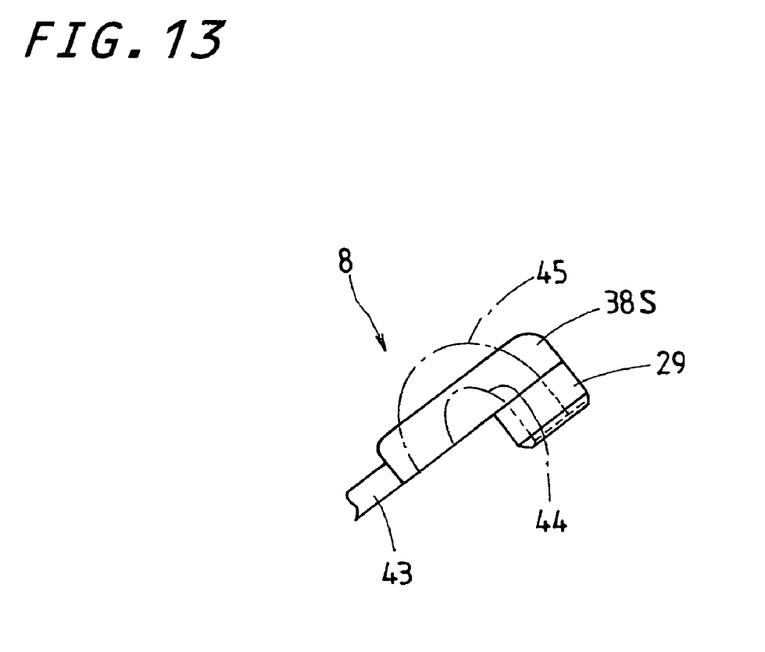
FIG. 13 is a view in side elevation of the spacer part when viewed in the direction of arrow (E) of FIG. 10.

With slider 2 in the linear motion guide unit constructed as stated earlier, after the spacer part 8 has fitted snugly into the mating depression 33 in the end cap major part 7 to form the end cap 4, the outside curved grooves 35 in the end cap major part 7 come into mating engagement with the inside curved grooves 41 in the spacer part 8 to complete the turnaround passages 30, while the spigot halves 28 on the end cap major part 7 come into mating conjunction with other spigot halves 29 of the spacer part 8 to form the circular spigots 27 whose inside circular surfaces define return passage ends 31 continuing the return passages 10. Thus, the return passage ends 31 are defined with inside circular surfaces 39E of the spigot halves 28 on the end cap major part 8 and other inside circular surfaces 39S of the spigot halves 29 on the spacer part 8, which make a mating conjugation with each other. In FIG. 13, there are plotted a bottom 44 of the inside curved groove 41 and a center line 45 of the turnaround passage 30.

Mating engagement of the lubricating grooves 42 of the end cap major part 7 with the lubricating grooves 43 cut in the spacer part 8 makes the lubricant paths 54 that extend from the lubricating port 20 to their associated spigots 27, especially in the version disclosed here, reach conjunction areas of the turnaround passages 30 with their associated return passages 10 to make sure of positive lubrication without causing any leakage of lubricant. Lubricant delivered from the lubricating port 20 flows through the lubricant paths 54 made up of the lubricating grooves 42 and their counterparts or lubricating grooves 43 mated with one another, followed by running through inside the spigots 27, and then lubricates the turnaround passages 30, return passages 10 and rolling elements 5. The lubricant film applied around the rolling elements 5 is transferred to the load-carrying races 40 as the rolling elements 5 roll through the races 40. Moreover, during when the rolling elements 5 with lubricant film run through the return passages 10, excess lubricant around the rolling elements 5 is absorbed in the porous or cellular texture of the tubular member 6 to be stored and released back from there onto the rolling elements 5 for a long-lasting service life. The turnaround passage portions 38S on the spacer part 8 fit into the mating deep steps 34 of the major part 7 to complete the turnaround passages 30 of composite curvature whose center line 45 as shown in FIG. 13 is less in curvature at ingress areas to the load-carrying races 40 and the return passages 10 when viewed in an arrowed direction (E), but changes sharply in curvature as going on into depth from the ingress areas, thereby making certain of smooth turnaround of the rolling elements 5 even though a distance (S) between the load-carrying race 40 and the return passage 10 is made less. The bridge portion 36 of the spacer part 8, as made trapezoidal in contour, takes up less space and is ready to produce it.

The linear motion guide unit constructed as stated earlier has high load capacity even though made small in construction. The return passages 10 are constituted with the tubular member 6 capable of continuing to apply lubricant to the rolling elements 5. This lubrication system makes sure of smooth sliding operation with high speed and high tact, and further positive lubrication with causing no leakage of lubricant. According to the linear motion guide unit of the present invention, lubricant supplied through the lubricating port 20 may be applied positively to the rolling elements 5 even though the load-carrying races 40 and the return passages 10 are made closer to one another to render the space for the turnaround passages 30 less than in the conventional construction.

What is claimed is:
1. A linear motion guide unit, comprising:
 a guide rail having first lengthwise raceway grooves thereon,
 a slider allowed to move in sliding manner relatively to the guide rail, the slider comprising:
  a carriage made thereon with second raceway grooves extending in opposition to the first raceway grooves and further made therein with a pair of return passages extending apart from load-carrying races defined between the first and second raceway grooves, end caps secured to forward and aft ends of the carriage and made therein with turnaround passages to communicate the load-carrying races and the return passages with one another, and a plurality of rolling elements capable of rolling through circulating circuits made up of the load-carrying races, the return passages, and the turnaround passages;

wherein the return passages are made in a geometric relation lying obliquely upwards of the load-carrying races while the return passages are apart from their associated load-carrying races by a distance less or equal to twice a diameter of the rolling elements;

wherein the end caps are made integrally thereon with spigots, each of which is raised above the associated end cap towards the carriage to connect with the associated return passage to form any one end of the return passage, while the end caps are made therein with a lubricating port and lubricant paths extending from the lubricating port to the spigots;

wherein the end caps are each made up of an end cap major part and a spacer part to fit into the end cap major part, and the end cap major part is made at widthwise opposite ends thereof with outside curved grooves to provide the turnaround passages, while the spacer part is made at widthwise opposite ends thereof with inside curved grooves to provide the turnaround passages;

wherein the end cap major part includes first turnaround passage halves having therein the outside curved grooves to provide the turnaround passages, first spigot halves communicating with the first turnaround passage halves to provide the spigots that constitute partly the return passages, and a top portion joining the first turnaround passage halves together and also joining the first spigot halves together with one another;

wherein the spacer part includes therein second turnaround passage halves having therein the inside curved grooves to provide the turnaround passages in combination with the first turnaround passage halves, second spigot halves communicating with the second turnaround passage halves to provide the spigots in combination with the first spigot halves, which constitute partly the return passages, and a bridge portion joining the second turnaround passage halves together and also joining the second spigot halves together with one another, and wherein the first spigot halves of the end cap major part join with the second spigot halves of the spacer part to complete the spigots and wherein the second spigot halves of the spacer part are each made to account for more in circular direction than a semicircle to provide any room for the lubricant paths.

2. A linear motion guide unit constructed as defined in claim 1, wherein the return passages are each made up of a tubular member of porous structure adapted to be impregnated with lubricant, the tubular member fitting into a bore made in the carriage, and the spigots fitting into forward and aft ends of the bore to join with the tubular member.

3. A linear motion guide unit constructed as defined in claim 1, wherein the end cap major part is made therein with mating depressions and deep steps cut in close along the mating depressions and wherein the spacer part is combined in place with the end cap major part in such a mating relation that the bridge portion of the spacer part fits into the mating depressions inside end cap major part while the second turnaround passage halves of the spacer part fit into the associated deep steps in the end cap major part.

4. A linear motion guide unit constructed as defined in claim 1, wherein the second spigot halves of the spacer part are each made to account for 53% to 62% of a circle round the spigots.

5. A linear motion guide unit constructed as defined in claim 1, wherein the end cap major part is made with the lubricating port and also made at the top portion thereof with first lubricating grooves communicating with the lubricating port, and wherein the spacer part is made at a bridge portion thereof with second lubricating grooves that are in opposition to the first lubricating grooves to mate with the first lubricating grooves to define the lubricant paths between them.

6. A linear motion guide unit constructed as defined in claim 1, wherein the guide rail is rectangular in transverse section and provided on both lengthwise sides thereof with the first raceway grooves, and the slider fits over and conforms to the guide rail to move relatively to the guide rail.

7. A linear motion guide unit constructed as defined in claim 1, wherein the end caps are made of synthetic resin stained blue different in color from the carriage.

\* \* \* \* \*